2,910,388

BROWN SUGAR

Alfred Lachmann, Haddonfield, N.J., and Freeman Bush, Philadelphia, Pa., assignors to The American Sugar Refining Company, New York, N.Y., a corporation of New Jersey No Drawing. Application March 14, 1956
Serial No. 571,371

5 Claims. (Cl. 127—30)

This invention relates to an improved free-flowing, non-caking brown sugar product in granular form, and an improved powdered brown sugar product made therefrom, and includes the new products and the methods of producing them.

The improved granular brown sugar product of the present invention is made by first drying ordinary brown sugar to remove the greater part of its normal water content, coating the dried brown sugar with a solution of an edible, non-hygroscopic solid, and drying the coated product to give a dry, coated, granular brown sugar product. By pulverizing the dried, granular product, an improved powdered brown sugar product is obtained.

An improved granular brown sugar product of especially valuable properties is produced by drying granular brown sugar, coating the dried brown sugar with a concentrated sucrose solution, and drying the coated product to form a free-flowing granular product with an outer sucrose layer or coating.

Commercial brown sugars are commonly marketed in a moist form. The handling of such sugars presents a number of problems to the industrial user as well as to the consumer. They are usually packaged in cartons or bags which are provided with moistureproof linings. As long as the bag or carton is closed, the brown sugar keeps its smooth texture. When a carton of brown sugar is opened and exposed to the air at room temperature, the sugar has a tendency to lose some of its moisture under certain climatic conditions, and during this drying out period, the brown sugar tends to cake and to harden. The hard lumps formed are difficult to disintegrate and present a number of handling and mixing problems to the industrial user and to the consumer.

Brown sugar contains, in addition to pure sucrose as its principal constituent, a coating of molasses which imparts the distinctive flavor and color to this type of sugar. The molasses, which is composed of sucrose, invert sugar, ash, water and other crystallizable and non-crystallizable compounds, surrounds the pure sucrose crystals in the form of a thin and sticky film. When brown sugar loses part of its moisture, by drying under certain atmospheric conditions, the thin film of molasses surrounding the sugar crystals increases in stickiness and cements the adjacent crystals together, thus forming a hard lump.

We have found that if ordinary granular brown sugar with its normal moisture content is first dried to remove a large portion and advantageously most of its normal water content, it can then be coated with a liquid coating material in the form of a solution of an edible, non-hygroscopic coating material, and the coated sugar then further dried to give a valuable, free-flowing granular brown sugar product with an outer coating of the added coating material.

We have found that if granular brown sugar is dried to a low moisture content, around 1.5% or less, and advantageously less than 1%, it can then be coated with a concentrated sucrose solution and the coated product then dried to a low moisture content to give a granular dry brown sugar product having unusual keeping properties and resistance to moisture and caking.

Ordinary brown sugar containing around 3.5% to 4% of water and with a sticky molasses coating, if coated with an added amount of aqueous solution of coating material, results in blending of the added aqueous layer with the molasses layer and gives a product of increased stickiness and one which it is difficult to dry without the formation of large lumps. But by drying the brown sugar before it is coated with the liquid coating, the molasses layer is converted into a form which does not readily blend with the added liquid, or blends therewith only to a limited extent. And such dried granular brown sugar can be coated with a liquid and the resulting product dried to give a final dried coated product with the coating material largely surrounding the dried molasses layer as an outer coating layer.

We have found that in general the drying of the brown sugar should be carried to the point where the moisture content is less than 2% and advantageously less than about 1.5%. And much better results are obtained when the moisture content is reduced to around 1% or less before the liquid coating is applied.

Different liquid coating materials can be used for coating the dried brown sugar before it is subsequently subjected to the further drying treatment. The coating materials used in solution are edible, non-hygroscopic coating materials which will adhere to the dried brown sugar when applied in solution and which, on drying, will give a coating of the material thus added in solution. Aqueous solutions of non-hygroscopic sugars can thus advantageously be used, as well as aqueous solutions of other non-hygroscopic edible solids which, on drying, will give a residual coating on the granular brown sugar product.

The coating of the dried brown sugar with the liquid coating material can be accomplished by different methods of procedure. One advantageous method is to spray the dried brown sugar with the liquid coating material and with agitation to insure uniform distribution of the coating liquid on the dried brown sugar granules. Another advantageous method is to mix the dried brown sugar with the liquid in a suitable mixing device which insures uniform and thorough intermixture and coating of the dried brown sugar with the liquid. For example, the predried granular brown sugar can be sprayed with a hot, saturated No. 1 sugar syrup with agitation of the sugar in a Hobart mixer, which is a dough-type mixer, and with continuation of the mixing and spraying until the proper amount of sugar solution has been added, e.g., advantageously up to around 10%, of sucrose based on the weight of the dried brown sugar used.

The predrying of the brown sugar can be carried out by different methods of drying, and advantageously by passing hot air in contact with the granular brown sugar while it is agitated and continuing the drying until the desired low moisture content has been obtained. The resulting dried brown sugar can be stored and subsequently treated, but is advantageously treated, while still hot from the drying operation, by adding the coating liquid, with continued agitation and with the carrying out of the further drying of the coated brown sugar with continued agitation and with the use of hot air until the final dried granular product is obtained.

Drying equipment such as the Hersey granulator can be used both for the initial drying of the brown sugar and for the further drying of the coated brown sugar; and it is one advantage of the present process that the drying of the granular brown sugar before coating and also the drying of the brown sugar after coating can be carried out in available drying equipment.

The drying of the granular brown sugar before coating, when carried out by the use of hot air at elevated temperatures and with agitation of the granular brown sugar to maintain it in a granular condition during the drying operation, gives a product which is hot and which, unless immediately coated while in a freshly prepared hot state, should be cooled to atmospheric temperature if it is to be kept and stored before further treatment. Similarly, the dried coated brown sugar, when the final drying is carried out by the use of hot air at elevated temperatures and with agitation of the coated brown sugar to maintain it in a granular condition, is a hot granular product which should be cooled, and advantageously rapidly cooled, to ordinary temperatures, advantageously with continued agitation during the cooling operation. The temperature of the dry, coated granular product leaving the drying apparatus should ordinarily be temperatures not exceeding about 85° to 90° F.

The proper drying time, both for the initial drying of the brown sugar and for the drying of the coated brown sugar, will depend upon the construction and type of drying equipment, the air temperature at which the product is dried, the rate of air passing through the drying equipment, and the feed of the raw material.

In general, the drying of the initial brown sugar should be carried to a point such that the dried brown sugar before coating has a moisture content not materially exceeding about 1% and advantageously materially less than 1%, although improved results have been obtained in some cases with somewhat larger percentages of moisture in the preliminarily dried brown sugar. So also, the drying of the coated brown sugar should, for best results, be carried to a point such that the moisture content of the final coated product is less than 1% and advantageously a small fraction of 1%, particularly where ordinary sugar syrup (sucrose) is used as the coating liquid.

In order to evaluate the caking resistance or resistance to moisture of the dried brown granular sugar product under controlled conditions, the following method was adopted for testing the caking resistance or resistance to moisture of the product:

The method was an accelerated method consisting in exposing 10 grams of the product to be tested in an open aluminum dish to a temperature of 85° F. and a relative humidity of 70%. The sample is slightly tilted during the experiment, in order to test its resistance toward flow.

When the product starts to lose its free-flowing characteristics, which is observed by tilting the dish back and forth, the time of resistance to caking is recorded.

These conditions represent adverse atmospheric conditions and, if the product is free-flowing under these extremely unfavorable conditions for a long period of time, it is assumed that it will resist caking under normal fluctuating atmospheric conditions.

The invention will be further described in connection with the following examples, but it will be understood that the invention is not limited thereto.

*Example 1.*—The brown sugar used was a soft No. 13 brown sugar with a sucrose (polarization) of 89.2% and a moisture content of 3.84%. This sugar was dried in a laboratory oven at approximately 90° C. to three different levels of moisture content, namely, 0.7%, 1.3% and 2%, and the three dried products thus produced were separately treated.

A portion of each of these predried brown sugars was then sprayed with a heated No. 1 sugar (sucrose) syrup solution of about 67% sucrose content. While the brown sugar was mixed and agitated in a Hobart mixer, the preheated syrup at about 85° C. was sprayed in the form of a fine and even spray onto the brown sugar, thus agitated, and the spraying was continued until 10% of the total syrup, i.e. 6.7% sucrose, based on the total weight of the brown sugar used, was added.

After the predried sugar had thus been coated with the sugar syrup, the respective samples were transferred to a laboratory granulator, in which they were dried with continued agitation for a period of about one hour with hot air at 130° C., and the products were then cooled with continued agitation to room temperature, about 80° F. All of the resulting coated products were screened through a No. 10 Tyler mesh screen, and the physical characteristics of the products were evaluated from the fraction which passed through the screen.

The product made from brown sugar predried to 0.7% and which was coated with the sucrose solution at room temperature, showed, after drying, a moisture content of 0.24%, and 96% of the product passed through a 10 mesh screen. The moisture resistance of the products thus produced was 6 to 8 hours.

The product made in a similar way from the brown sugar predried to 1.3% moisture content had a moisture content after coating and drying of 0.21%, and 87% of the product passed through a 10 mesh screen. The product also had a moisture resistance of 6 to 8 hours.

In the case of the product made from brown sugar predried to 2% moisture, and with the coated product having a moisture content after drying of 0.34%, only 58% passed through a 10 mesh screen, but the granular product thus produced also had a moisture resistance of 6 to 8 hours.

*Example 2.*—The predried brown sugar referred to in the preceding example and having a moisture content of 0.7% was heated to a temperature of about 70° C. before the No. 1 sugar syrup was sprayed onto the hot sugar, the procedure otherwise being similar to that described in Example 1. The product, after coating, was dried in the granulator, cooled to room temperature, and screened. The resulting coated product, after drying, had a moisture content of 0.26%, 97% of the product passed through a 10 mesh screen, and the product had a moisture resistance of 6 to 8 hours.

*Example 3.*—The brown sugar used in this example was a No. 13 soft brown sugar of the following composition: sucrose (polarization), 87.20%; invert, 4.27%; ash, 2.14%; moisture, 3.79%; and undetermined, 2.60%.

This brown sugar was predried in a small rotary drum to a moisture content of 0.88%. The predried sugar was screened through a No. 14 Tyler mesh screen to remove oversize, and fines passing through a No. 56 Tyler mesh screen were also removed before the predried granular product was sprayed with the sucrose solution.

The predried granular brown sugar was coated with a No. 1 sugar syrup which was a commercial product of 67 Brix, using a spray gun filled with the cold solution and applying the spray to the cold brown sugar while it was being agitated in a Hobart mixer to insure homogeneous mixing and coating of the syrup on the brown sugar granules.

Different amounts of sugar syrup were added in this way and the coated brown sugar was then dried in the laboratory granulator with continued agitation and the passage of hot air at about 130° C. and for a period of about 40 minutes, and, after drying, the product was cooled in the apparatus with continued agitation for about 20 minutes, until it was at room temperature. The product was screened through a 14 Tyler mesh screen and on a No. 56 Tyler mesh screen to give a product ready for packaging.

The predried brown sugar, without any coating of sucrose and having a moisture content of 0.88%, had a moisture resistance of only 25 minutes. When this product was coated with an amount of sucrose equal to 3.3% and the coated product dried to a moisture content of 0.50%, the moisture resistance was increased to 65 minutes. When the sucrose applied was increased to 5.0%, the coated, dried product had a moisture content of 0.61% and a moisture resistance of 120 minutes. The further increase of the sucrose coating to 6.7% and with a moisture content of the coated dried product of 0.78% had a remarkable moisture resistance of 5 hours. Increasing the sucrose applied to the predried brown sugar to 8.3% gave a dried coated product with a moisture content of 0.75% and a moisture resistance of 5 hours. Increasing the sucrose content applied as a coating to 12.5% gave a dried coated product with a moisture content of 0.78% and a moisture resistance of 350 minutes. In all of these cases, practically all of the product passed through a 10 mesh screen.

When the sucrose coating was increased to 20% and 30%, considerable amounts of lumps were obtained, and only 65% and 45% respectively of the dried products passed through a 10 mesh screen, although the granular product thus obtained and with a moisture content of around 0.8%, had high moisture resistance of around 365 and 320 minutes.

Example 4.—The same brown sugar was used as in the preceding example, but the predrying of the brown sugar was carried to a point where the moisture content was 0.35%. The moisture resistance of this product was 35 minutes. When this granular brown sugar was coated with sucrose solution corresponding to 3.3% sucrose and the coated product was dried, it had a moisture content of 0.54% and the moisture resistance was increased to 90 minutes. When the sucrose applied as the coating was increased to 5.0%, the dried, coated product had a moisture content of 0.50%, and a moisture resistance of 140 minutes. When the sucrose coating was increased to 7.5%, the dried coated product had a moisture content of 0.54% and a remarkable moisture resistance of 330 minutes. A further increase of the sucrose coating to 10% gave a product with a moisture content of 0.54% and a moisture resistance of 350 minutes. Further increases of the sucrose coating to 12.5% and 15% gave products of moisture content of 0.39% and moisture resistance respectively of 380 and 400 minutes. Practically all of the products thus produced passed through a 10 mesh screen. The drying temperature used in the above tests was 140° C., and the drying time about 60 minutes.

The products produced by the above examples were readily soluble, requiring a dissolving time similar to that of ordinary brown sugar.

Examination of the products under a microscope indicated that a fine film or layer of sucrose crystals was formed around the brown sugar granules or clusters and protecting the dried molasses layer from contact with the surrounding atmosphere.

From the above examples, it is evident that the amount of sucrose used for coating the dried brown sugar can be somewhat varied, but that best results are obtained, from the standpoint of keeping qualities of the product, with an amount of sucrose within the range of about 6%–10%. Increased amounts of sucrose do not materially improve the keeping qualities.

In contrast with the coating of predried brown sugar, experiments were carried out with the spraying of undried brown sugar or brown sugar having a moisture content around 4% and with varying amounts of sucrose solution added. Thus, brown sugar with a moisture content of 4.26% was dried with hot air at a temperature of 140° for 60 minutes and gave a product with a moisture content of 0.63% and a moisture resistance of 40 minutes. Coating this brown sugar with a sucrose solution amounting to 3.3% sucrose and then drying gave a dried product with a moisture content of 0.47% and with only 50 minutes moisture resistance. Increasing the sucrose coating to 6.7%, and with drying to give a dried product of 0.47% moisture content, gave a product with a moisture resistance of 125 minutes. And using 10% sucrose to coat the undried brown sugar, and drying gave a product with a moisture content of 0.51% and a moisture resistance of 140 minutes; whereas products were obtained, by coating predried brown sugar with 10% sucrose, as indicated by the above examples, with a moisture resistance of 5 to 8 hours.

The use of a concentrated sucrose solution for coating the predried brown sugar has the advantage that the product not only has remarkable keeping properties and resistance to moisture, but is readily soluble and has the normal brown sugar taste and flavor.

Instead of using a sucrose solution, solutions of other non-hygroscopic sugars can be used in a similar way. The predrying of the brown sugar before coating with the sugar solution prevents or limits the intermixing of the added sugar layer with the dried molasses layer and gives a coating layer which is made up largely or entirely of the coating sugar, with only a limited blending of the dried molasses layer with the added coating layer.

In a similar manner, other aqueous solutions of non-hygroscopic edible solids can be used to form coated brown sugar products coated with the edible materials so used.

The new granular product produced as above described can advantageously be pulverized to give a valuable new pulverulent product. The pulverizing of dried granular brown sugar to form a pulverulent product is described in the prior application of one of the present applicants, Ser. No. 550,534. The granular product of the present invention can advantageously be pulverized, as described, in said prior application, to give a pulverized product with a high resistance to moisture.

The pulverized product so produced will have the sucrose content of the sucrose crystals of the original brown sugar product and also the dried molasses layer and the outer sucrose coating converted into a finely pulverized form, with a major portion of the product made up of sucrose and with the pulverized dried molasses component of the product uniformly distributed throughout the pulverulent product.

We claim:

1. The method of producing an improved brown sugar product which comprises drying granular brown sugar to remove the greater portion of the water therefrom, coating the dried granular brown sugar with a concentrated solution of an edible non-hygroscopic sugar by spraying the concentrated solution on the dried granular brown sugar with agitation, and the amount of such solution having a sugar content of between about 3.3% and 20% of the brown sugar and drying the coated product with agitation to give a dry, coated, granular brown sugar product containing a fraction of 1% of moisture.

2. The process according to claim 1 in which the predrying of the granular brown sugar before coating is carried out at an elevated temperature with agitation, and in which the coated brown sugar is also dried at an elevated temperature with agitation, and then cooled to a temperature below about 90° F. with agitation.

3. The process according to claim 1 in which the granular brown sugar is first dried to less than about 1.5% moisture before coating and subsequent drying.

4. The process according to claim 1 in which the partially dried granular brown sugar product is coated with a concentrated sucrose solution, followed by drying to give a free-flowing, non-caking, granular brown sugar product having an outer coating of sucrose thereon.

5. The method of producing an improved granular brown sugar product which comprises subjecting granular brown sugar to partial drying to remove the greater portion of the water therefrom, coating the resulting dried granular product with a concentrated solution of sucrose to the extent of around 6%–10% of sucrose by spraying the dried granular product with the concentrated solution with agitation, and the amount of such solution having a sugar content of between 3.3% and 20% of the brown sugar, and drying the coated granular product with agitation to give a granular, free-flowing, non-caking, brown sugar product containing a fraction of 1% of moisture and with an outer sucrose layer produced by the coating and drying operation.

(References on following page)

References Cited in the file of this patent

UNITED STATES PATENTS 2,400,292  Dalton ---------------- May 14, 1946
2,818,356  Shookhoff ------------- Dec. 31, 1957

OTHER REFERENCES

Ser. No. 356,560, Hara (A.P.C.), published May 11, 1943.

Beet-Sugar Technology, ed. by R. A. McGinnis, copyright 1951, Reinhold Pub. Corp., New York, N. Y., pp. 414–415, 388 and 389.